United States Patent
Smith et al.

(10) Patent No.: US 7,710,396 B2
(45) Date of Patent: May 4, 2010

(54) MULTIMEDIA USER INTERFACE

(75) Inventors: Gregory C. Smith, Scotts Valley, CA (US); Thomas J. Quinn, Los Gatos, CA (US); James J. Leftwich, Palo Alto, CA (US)

(73) Assignee: Thomson Licensing, Boulogne, Billancourt (FR)

( * ) Notice: Subject to any disclaimer, the term of this patent is extended or adjusted under 35 U.S.C. 154(b) by 1045 days.

(21) Appl. No.: 11/329,876

(22) Filed: Jan. 11, 2006

(65) Prior Publication Data

US 2006/0164386 A1   Jul. 27, 2006

Related U.S. Application Data

(62) Division of application No. 10/428,600, filed on May 1, 2003, now Pat. No. 7,233,316.

(51) Int. Cl.
   *G09G 5/08* (2006.01)

(52) U.S. Cl. .......................... 345/157; 341/20; 341/21; 348/14.03; 348/14.05; 463/23; 463/36; 463/37; 715/740; 715/810; 715/863

(58) Field of Classification Search ......... 345/156–158; 348/14.03, 14.05, 734; 715/711, 715, 740.779, 715/784, 800, 808, 810, 821, 863; 341/20, 341/21; 463/23, 36, 37

See application file for complete search history.

(56) References Cited

U.S. PATENT DOCUMENTS

| 5,138,154 A | 8/1992 | Hotelling ................ 250/231.12 |
| 5,252,951 A * | 10/1993 | Tannenbaum et al. ....... 345/156 |
| 5,416,535 A | 5/1995 | Sato et al. |
| 5,440,326 A | 8/1995 | Quinn ......................... 345/156 |
| 5,554,980 A | 9/1996 | Hashimoto et al. ..... 340/825.72 |
| 5,594,169 A | 1/1997 | Field et al. ................ 73/504.14 |
| 5,698,784 A | 12/1997 | Hotelling et al. ......... 73/504.16 |
| 5,809,204 A * | 9/1998 | Young et al. ................... 386/83 |
| 5,825,350 A | 10/1998 | Case et al. ................... 345/163 |
| 5,898,421 A | 4/1999 | Quinn ......................... 345/156 |
| 6,130,664 A | 10/2000 | Suzuki ........................ 345/158 |
| 6,175,357 B1 | 1/2001 | Gordon ....................... 345/158 |
| 6,195,122 B1 * | 2/2001 | Vincent ...................... 348/169 |
| 6,346,891 B1 | 2/2002 | Feinleib et al. ......... 340/825.69 |
| 6,392,664 B1 | 5/2002 | White et al. ................. 345/717 |
| 6,601,238 B2 | 7/2003 | Morrison et al. .............. 725/50 |
| 6,765,557 B1 | 7/2004 | Segal et al. .................. 345/173 |
| 6,772,433 B1 | 8/2004 | LaJoie et al. .................. 725/52 |
| 7,233,316 B2 * | 6/2007 | Smith et al. ................. 345/157 |

(Continued)

FOREIGN PATENT DOCUMENTS

JP   H02-37900 B1   2/1990

(Continued)

*Primary Examiner*—Henry N Tran
(74) *Attorney, Agent, or Firm*—Robert D. Shedd; Vincent E. Duffy; Michael A. Pugel

(57) ABSTRACT

A user interface for multimedia centers advantageously utilizes hand-held inertial-sensing user input devices to select channels and quickly navigate the dense menus of options. Extensive use of the high resolution and bandwidth of such user input devices is combined with strategies to avoid unintentional inputs and with dense and intuitive interactive graphical displays.

25 Claims, 6 Drawing Sheets

U.S. PATENT DOCUMENTS 7,292,771 B2 11/2007 Nomura et al.
2004/0095317 A1 5/2004 Zhang et al. ................ 345/158

FOREIGN PATENT DOCUMENTS

| JP | 4-1992-334197 | B1 | 11/1992 |
| JP | 05-219580 | A1 | 8/1993 |
| JP | 7-184287 | A1 | 7/1995 |
| JP | P2001-296947A | B1 | 10/2001 |
| JP | 2002-152635A | B1 | 5/2002 |
| JP | P2003-111171 | B1 | 11/2003 |

\* cited by examiner

MULTIMEDIA USER INTERFACE

CROSS-REFERENCE TO RELATED APPLICATIONS

This application is a divisional of U.S. application Ser. No. 10/428,600, filed on May 1, 2003, now U.S. Pat. No. 7,233,316, herein incorporated by reference.

FIELD OF THE INVENTION

The present invention relates to an interface for an interactive multimedia center including a television, a video recorder, a computer and general network and/or internet access capabilities. The present invention particularly relates to the use of a hand-held angle-sensing "in-air" pointing device and a new graphic user interface for such interactive multimedia centers.

BACKGROUND OF THE INVENTION

Interactive multimedia centers are characterized by an increasing number of channels of programming available and an increasing amount of functionality offered. The increased number of available channels results from increased program availability from such services as cable and satellites. New types of functionality include recording, time-shifting, and convergence with the Internet. These increases in available programming and functionality result in a dense and complex user interface in an environment that typically does not have a desktop for a mouse or keyboard, the standard input devices for the complex user interfaces typical of personal computers. Rather, the typical user input devices of choice for televisions and multi-media centers is one or more infra-red (IR) remote controls laden with pushbuttons, including arrow, keypad and dedicated function buttons. These button-laden remote controls are utilized for the selection of channels and functions and for onscreen navigation. However, current interactive televisions and multi-media centers now have too many channels and functions for this type of interface to be effective and a more efficient interface is desired.

One bottleneck in this interactive interface is the button-laden remote control. Remote controls typically provide directional arrow buttons for limited incremental on-screen navigation and a baffling array of dedicated buttons for the numerous functions. Pressing the "arrow keys" generally selects the adjacent on-screen element in the direction associated with the arrow. While simple to understand and implement, this step-wise interface is slow and tedious and an impediment to the efficient interaction with the large number of channels and functions in interactive television and multi-media centers.

A second bottleneck is the graphical user interface itself. Program guides, also referred to as "grid guides," are commonly used for displaying available programming. Program guides generally display six to ten horizontal bands, with each band representing channels of available programming. Each horizontal band is broken into segments representing the time when programming changes, which commonly occurs on the hour or half-hour. Users typically scroll and/or page up and down through the available channels in a large loop connected end-to-beginning. Scrolling/paging up generally moves lower in channel number and scrolling/paging down moves higher in the channel listings. Scrolling/paging right in a program guide takes the user ahead in time to scheduled programming and scrolling/paging left goes back in time through the scheduled programming.

Interaction with elements in a program guide is done with the directional arrow buttons on the remote control representing up, down, left, and right. These buttons are generally configured to operate in a step-wise fashion. That is, one click of the button represents one incremental move in the corresponding direction. Also, typical of most program guides are auto-highlighting elements referred to as "Program Cells" within the program guide. As the user steps up and down and back and forth within the program grid, Program Cells are highlighted in sequence, one at a time, indicating the user's interactive position in the display.

As cable, satellite, and internet-delivered programming increases, the small number of programs that fit on a standard program guide display becomes an increasingly smaller percentage of all programs available to the user. Moving through the entire channel lineup and seeing which programs are favorites or what types of programs are available by theme becomes an ever more tedious undertaking. Users may compensate for this in a variety of ways, ranging from memorizing the channel numbers of favorites or remembering how many pages down a desired channel is from another. Providers may attempt to compensate by positioning preferred programs "up front," but at the expense of viewer choice and control. However, neither of these solutions is sufficient and a new type of user interface is required to overcome this problem.

Preferably, such an interface and controller would allow efficient navigation, selection and activation in a dense interface that requires fewer individual buttons on the remote control and allows the user to view the screen rather than the remote control while making selections. Unlike a computer interface, the preferred new interface would not use a mouse, as no desktop is generally available in a television environment, and the interface would not require an on screen cursor.

SUMMARY OF THE INVENTION

The present invention includes a new graphical user interface adapted for use with a hand-held angle-sensing remote control for control of a multi-media center. The angle-sensing remote control moves a state change on a program guide display in response to pitch and yaw movements of the controller. Movement of the state change up and down on the display is accomplished in response to changes in pitch of the controller, movement left and right is accomplished in response to changes in yaw of the controller. In contexts where all-directional movement is appropriate, the angle-sensing wireless remote control can be configured to allow complete directional freedom. In situations such as vertical listings or a horizontal arrays of option icons, the interface is configured to respond asymmetrically to movement of the control so as to favor movements along certain axes and to reduce response to others so as to distinguish intended from unintended user inputs while not affecting the way the user physically reacts with the remote control.

Controllers capable of responding to the pitch, yaw and roll (i.e. angle-sensing controllers, as distinguished from position-sensing controllers) are ideally suited for precisely navigating dense interfaces because hand movements naturally provide not only high resolution in direction, speed and acceleration, but also large bandwidth and linear response (faithfully corresponding output to input motion) which makes them ideally suited for quickly navigating long lists. Inertial angle-sensing controllers can be configured from gyroscopic or accelerometer-based sensors.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION

Figure 1:
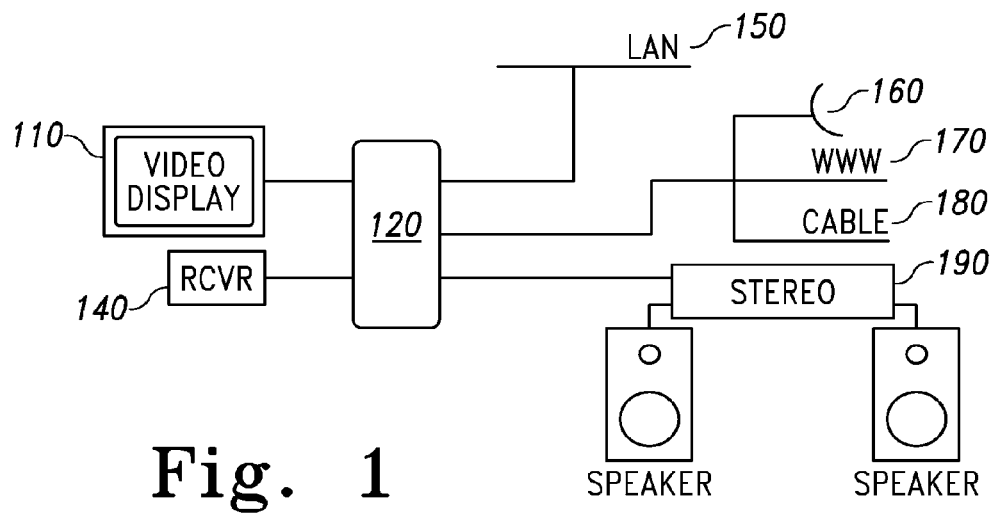
FIG. 1 is a block diagram of a multimedia center including a gyro-based remote control according to the present invention.

A typical multi-media center in accordance with the preferred embodiment of the present invention is illustrated in FIG. 1. The multi-media center includes a video display 110, which may be a conventional television with a tuner, a multi-media computer 120, a remote controller 130, a receiver 140 for the remote controller, and multiple input sources, including a LAN 150, a satellite 160, an interface to the worldwide web 170 and a television cable input 180. In this illustration a stereo system 190 under the control of the multi-media computer is shown coupled to the multi-media computer 120. However, as is well known in the art, there are many alternative configurations for these components.

A hand-held angle-sensing controller is described in U.S. Pat. No. 5,898,421, titled GYROSCOPIC POINTER AND METHOD, issued to Thomas J. Quinn Apr. 27, 1999, and U.S. Pat. No. 5,440,326, titled GYROSCOPIC POINTER, issued to Thomas J. Quinn Aug. 8, 1995. The hand-held gyroscope described is adapted for use as a cursor control device for a computer. The controller responds to angular movements (i.e. pitch and yaw) of the user's hand, which are subsequently converted to object or state movement within the electronic display permitting relatively large, fast and accurate movements to be accurately defined without requiring large and tiring hand movements. The controller is self-contained (i.e. inertial) and is thus not subject to sources of outside noise or and is not constrained to use in any specific orientation or within any predetermined volume. More specifically, the resulting controller is responsive to angles defined by movements of the controller (i.e. changes in the direction of pointing vectors), as distinct from detecting its position relative to a reference device or surface, and can be used either in free space or while sitting on a surface. Unlike a classical pointing device, such as a stick or flashlight, it does not require position or vector information to "point" to another fixed position. Rather, the angle information, i.e. changes in "yaw" and "pitch," is transformed directly into changes in the "x" and "y" coordinates within a display. These coordinates can be used to translate a cursor position on a graphics display or otherwise interact with the graphics user interface. This input device has both high bandwidth and precision, and has been generally used as an "in-air" replacement for the conventional mouse in applications such as computer-driven presentations where the use of a mouse is inconvenient.

An improvement to the user interface for inertial angle-sensing controllers such as described above is found in U.S. Pat. No. 5,825,350 issued to Case, Jr. et al. Oct. 20, 1998, and titled Electronic Pointing Apparatus and Method. In the process of generating movement data, the microprocessor described in the '350 Case, Jr. et al. patent minimizes unintentional cursor movement caused by instability of the gyroscopes and the inability of a person to hold the pointing apparatus absolutely motionless. Specifically, movement below a first threshold amount (undetectable to a person) is deemed unintentional movement, and the microprocessor adjusts the movement data to inhibit an indication of such movement. Movement above the first threshold amount and below a second threshold amount is deemed partially intentional and partially unintentional, and, consequently, the microprocessor reduces the amount of movement indicated by the data.

Further, improvements in gyroscopes, especially in their miniaturization and accuracy, have made them even more suitable for use as hand-held input devices. Such improvements are described in U.S. Pat. No. 5,138,154, issued to Steven P. Hotelling Aug. 11, 1992, and titled Shaft Angle Encoder with Rotating Off-Axis Interference Pattern; U.S. Pat. No. 5,594,169, issued to Field et al. Jan. 14, 1997, titled Optically Sensed Wire Gyroscope Apparatus and System, and Methods for Manufacture and Cursor Control; and U.S. Pat. No. 5,698,784, issued to Hotelling et al. Dec. 16, 1997, titled Vibratory Rate Gyroscope and Methods of Assembly and Operation.

Figure 2:
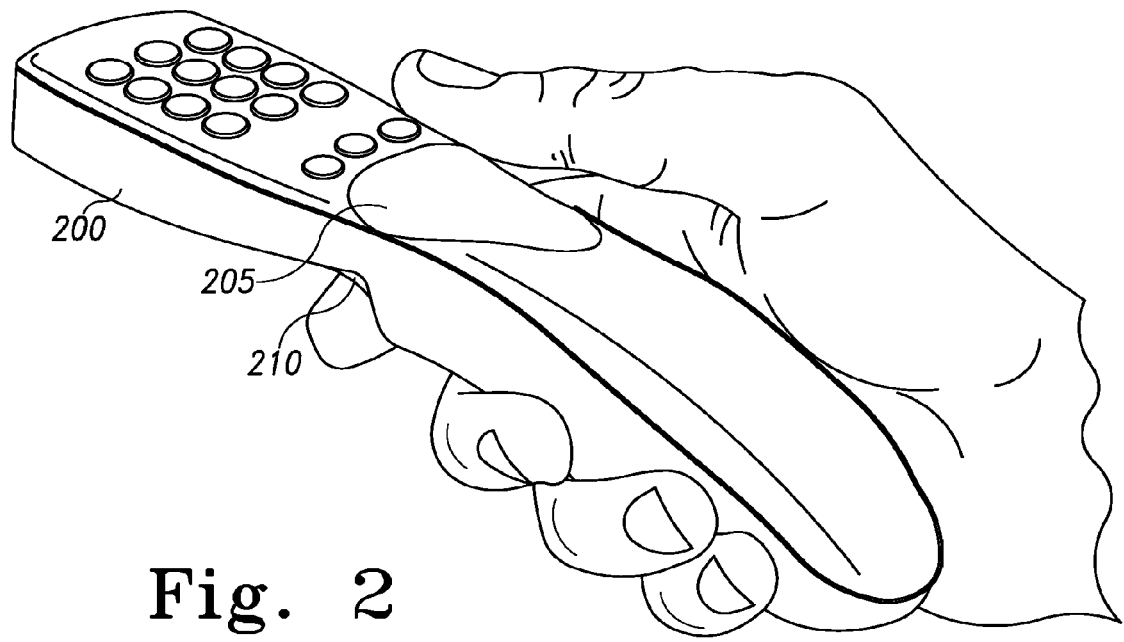
FIG. 2. A wireless hand-held angle-sensing controller of the gyroscopic type in accordance with the preferred embodiment of the present invention.

Many of these improvements are included in the gyroscopic hand-held controller 200, illustrated in FIG. 2, in accordance with the preferred embodiment of the present invention. Controller 200 includes a thumb button 205, positioned on the top side of controller 200 so as to be selectively activated by a user's thumb. Throughout this description, activation of thumb button 205 will also be referred to as a "click," a command often associated with activation or launch of a selected function. Controller 200 further includes a trigger button 210, positioned on the bottom side of controller 200 so as to be selectively activated by a user's index (or "trigger") finger. Throughout this description, activation of trigger button 210 will also be referred to as a "trigger," and angular movement (i.e. pitch and/or yaw) of the controller 200 while the trigger is depressed will be referred to as a "trigger-drag." A trigger-drag command is often associated with movement of a cursor, virtual cursor or other indication of the user's interactive position on the display, such as a change of state (i.e. a highlighted or outlined cell), and is commonly used to navigate in and select entries from the interactive display.

Figure 3:
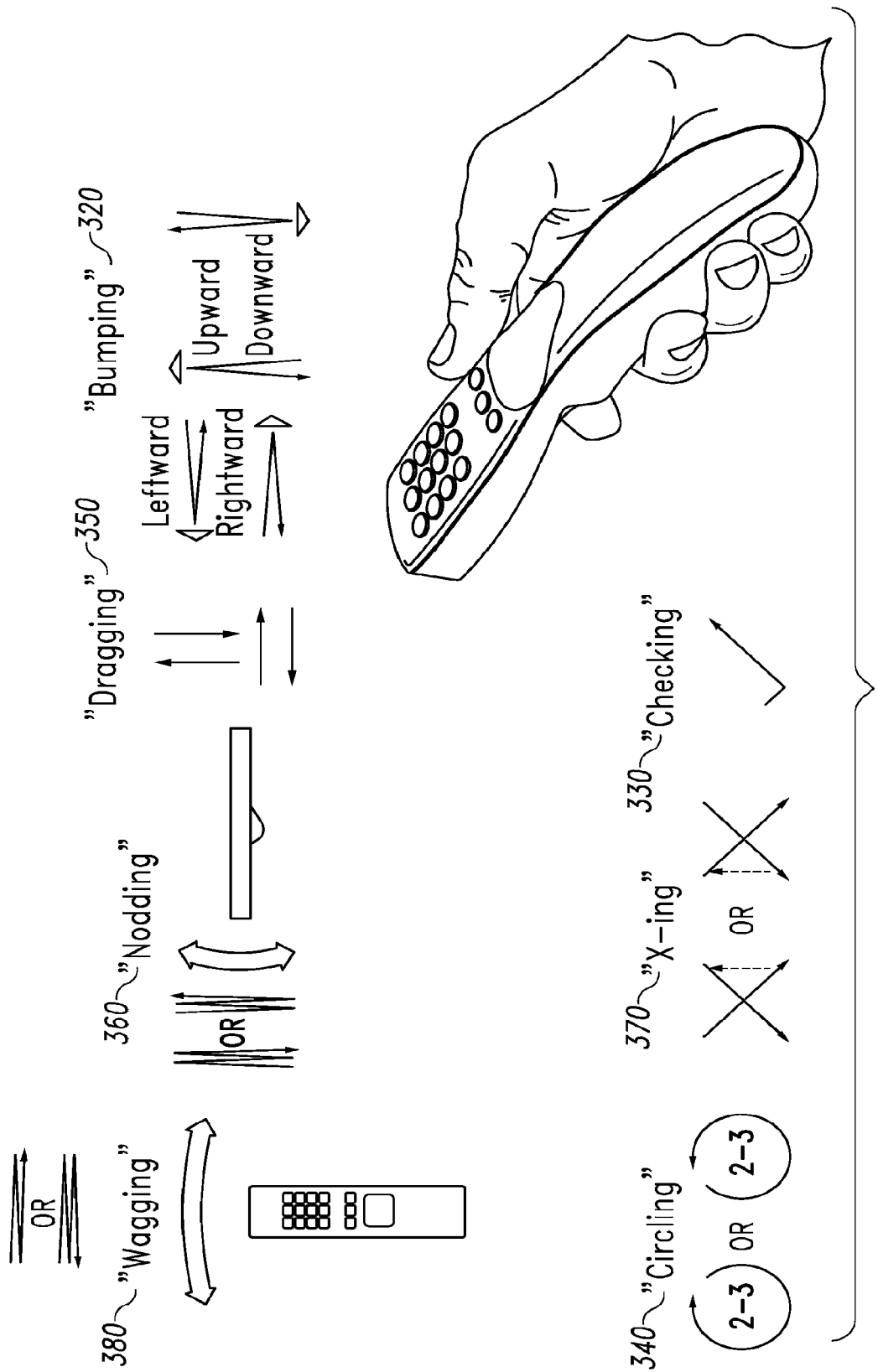
FIG. 3 illustrates a number of gestures in accordance with the present invention.

The use of a hand-held angle-sensing controller provides for a number of types of user interaction. When using an angle-sensing controller, changes in yaw map to left-and-right motions, and changes in pitch map to up-and-down motions. These inputs are used to define gestures and the gestures, in turn, define specific contextual commands. As such, a combination of yaw and pitch can be used to define any 2-dimensional motion, such as a diagonal. A number of gestures are illustrated in FIG. 3. Gestures are interpreted in context and are identified by defined movements of the controller 200 while the trigger button 210 is held ("trigger-drag" movements).

Bumping 320 is defined by a two-stroke drawing indicating pointing in one direction, either up, down, left or right. The bumping gesture is associated with specific commands in context. For example, in the TimeShifting mode, a left-bump gesture 320 indicates rewinding, and a right-bump gesture indicates fast-forwarding. In other contexts a bump gesture 320 is interpreted to increment a particular value in the direction designated by the bump. Checking 330 is defined as in drawing a checkmark. It is similar to a downward bump gesture 320. Checking is identified in context to designate a reminder or user tag. Circling 340 is defined as drawing a circle in either direction. It is possible that both directions could be distinguished. However, to avoid confusion, in the preferred embodiment a circle is identified as a single command regardless of direction. Dragging 350 is defined as an angular movement of the controller (a change in pitch and/or yaw) while holding trigger button 210 (i.e. a "trigger drag"). The dragging gesture 350 is used for navigation, speed, distance, time-shifting, rewinding, and forwarding. Dragging 350 can be used to move a cursor, a virtual cursor, or a change of state, such as highlighting outlining or selecting on the display. Dragging 350 can be in any direction and is generally used to navigate in two dimensions. However, in certain interfaces it is preferred to modify the response to the dragging command. For example, in some interfaces operation in one dimension or direction is favored with respect to other dimensions or directions depending upon the position of the virtual cursor or the direction of movement. This asymmetry is described in more detail in context with the specific interfaces below. Nodding 360 is defined by two fast trigger-drag up-and-down vertical movements. Nodding 360 is used to indicate "Yes" or "Accept." X-ing 370 is defined as in drawing the letter "X." X-ing 370 is used for "Delete" or "Block" commands. Wagging 380 is defined by two trigger-drag fast back-and-forth horizontal movements. The wagging gesture 380 is used to indicate "No" or "Cancel."

Figure 4A:
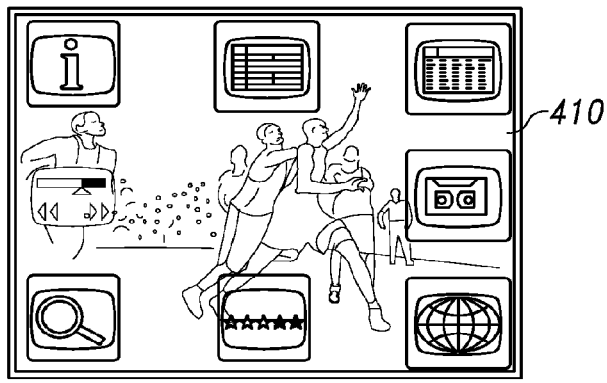
FIG. 4a is an illustration of options access display 410.

A top-level interactive options access display 410 is illustrated in FIG. 4a. This display provides direct on-screen access to the primary options available in the user interface. The wagging gesture 380 or the activation of a dedicated button on remote control 200 launches options access display 410 during normal viewing. Options access display 410 provides a display of eight large, translucent icons, each having a unique symbol and each icon representing a unique user-selectable function. These translucent icons overlay the ongoing display of the current programming.

Figure 4B:
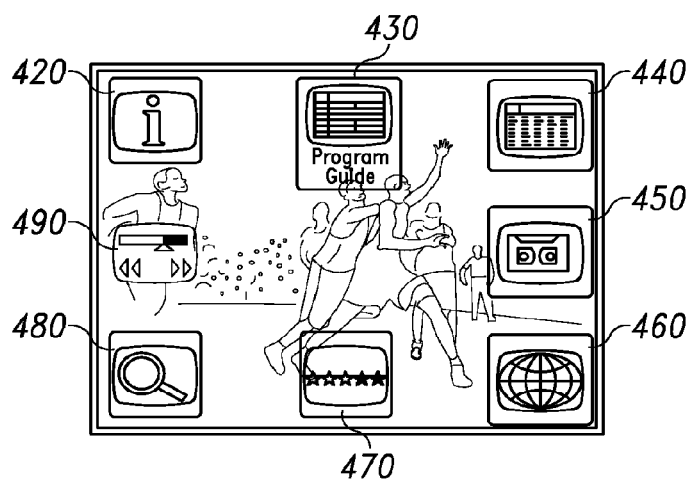
FIG. 4b is an illustration of options access display 410 with program guide icon 430 highlighted/selected.

In the preferred embodiment, there is no visual cursor. However, the interface often reacts as if a virtual cursor appeared at the center of the screen when the user activates trigger 210. As the user moves the virtual cursor by moving remote control 200 with the trigger 210 activated, (i.e. "trigger-drags"), on options access display 410, these icons are selectively highlighted, as if selected by the virtual cursor entering (or coming into proximity to) one of the translucent function icons. When a function icon is designated/highlighted, such as program guide icon 430 illustrated in FIG. 4b, the function icon is enlarged and a text label indicating the function(s) associated with the icon is provided. This permits the user to easily, freely, and quickly designate a selected one of the functions. A designated/highlighted function is launched in response to pressing ("clicking") the thumb button 205.

For example, the program guide function is launched by taking the following steps: First, the options access display 410 is launched, as described above. Second, the user "trigger-drags" upward (i.e. pitches the controller upward) to designate/highlight program guide icon 430. Finally, the designated/highlighted program guide function is launched by pressing ("clicking") thumb button 205.

In the preferred embodiment, the user interface for options access display 410 exhibits an asymmetry with regards to the interpretation of movements of controller 200. More specifically, once options access display 410 is launched and trigger button 210 activated, the function icon desired by the user is determined in response to the direction, and one or more of the displacement, speed and acceleration, of the "virtual cursor." The direction and one or more of displacement, speed and acceleration inputs are used to determine if the user intends to designate a given function. For example, a swift or long movement in a direction directed towards program guide icon 430 is interpreted as a command to designate that function. A slow series of movements in different directions is interpreted as ambiguous user input. The virtual cursor is "positioned" a center screen on launch and a first threshold or set of thresholds is used such that it is relatively easy for a user to designate a function icon. However, once a first function icon is designated, a higher threshold or set of thresholds is implemented and a bias is added to the input so that a larger movement of the "virtual cursor" is required to exit the designated function icon. This asymmetry is referred to as "magnetism," a term which intuitively describes the tendency for a designated function icon to remain designated. (i.e. the "virtual cursor" appears to be "stuck," "pulled" or "magnetized" to an icon. This interface is especially helpful in reducing the number of unintended commands in the user interface.

The eight function icons are located at different angular positions from the center of the screen, which conveniently map from angular hand motions sensed by remote control 200. The options are briefly described below, moving around the screen in a clockwise manner. The currently tuned program information 420 is located in the top left corner. This function provides information about the currently tuned program. Program guide icon 430 is located in the top center. This is a typical grid guide and displays 6 channels per page. A 500-channel overview guide 440 is located in the top right corner. This new function is described in detail below. The recorder control 450 is located in the middle right and provides various recording functions. The web/internet control 460 is located in the bottom right corner and provides access to web browsing, email, etc. The rate-it control 470 (used to assign 1-5 Stars) is located in the bottom center and provides the user the ability to indicate preferences by either multiple choice or real time response tracking. The find/search control 480 (which includes filtered lists) is located in the bottom left corner and provides for search for, favorites or filtered listing searches. The TimeShift Control 490 is located in the middle left and provides rewind, fast-forward, and program shuttle functions. This function is described in more detail below.

As can be appreciated, television interfaces can include additional options, including audio/visual adjustments, additional program-based manipulation, and further program information functions. Only a typical group of these functions has been implemented in the present invention. However, as can be readily appreciated, the interface techniques of the present invention can be used for functions other than those specifically described herein.

Further, the Options Access menu can be accessed from any point in the system—e.g. it is not necessarily a top level menu screen that is at the top of a tree structure and therefore must be "navigated to." Rather, it can be instantly accessed even if the user has "drilled down" many levels to get to their current activity. This instant access is accomplished in response to the detection of a predefined gesture or the activation of a dedicated button on controller 200.

The TimeShift Function.

Figure 5A:
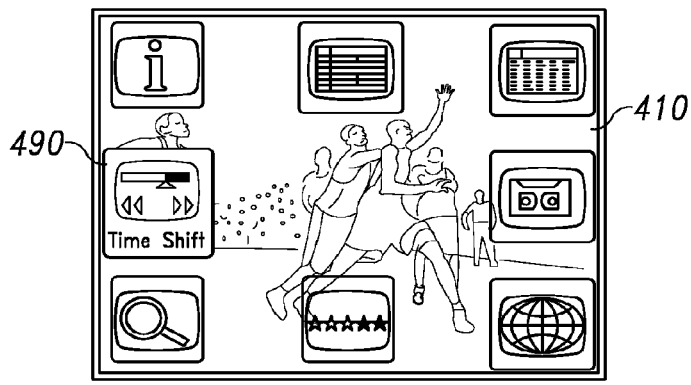
FIG. 5a is an illustration of options access display 410, with the TimeShift function icon 490 highlighted/selected.
Figure 5B:
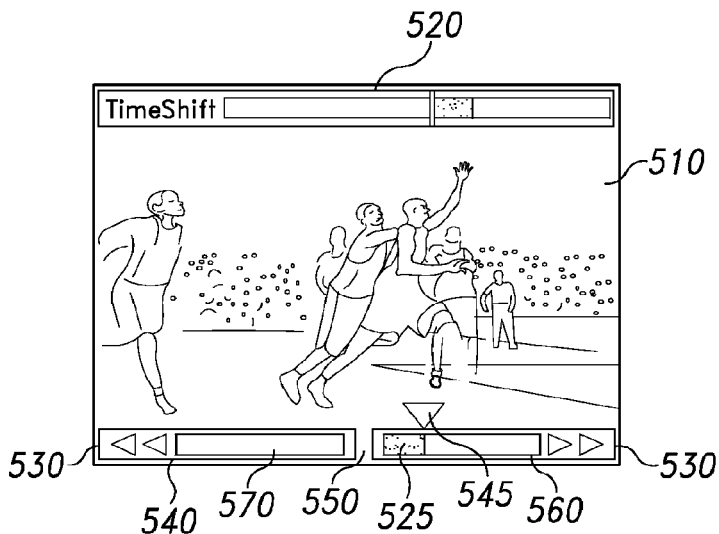
FIG. 5b is an illustration of the TimeShift display screen with the rewind/fast-forward function active.

Designating TimeShift function icon 490 in options access display 410, as illustrated in FIG. 5a, and pressing thumb button 205 launches the TimeShift function. Launching the TimeShift function results in the display of TimeShift screen 510 illustrated in FIG. 5b. Alternatively, the TimeShift function can be launched from a dedicated button on remote control 200 or a predefined gesture. TimeShift screen 510 includes the TimeShift control 520 positioned at the top of the display, and a rewind/fast-forward control 530 positioned at the bottom of the screen. These controls are superimposed over the currently tuned program.

The Rewind/Fast-Forward Control.

Rewind/fast-forward control 530 is activated upon launch of the TimeShift function and appears as a horizontal "thermometer-style" bar at the bottom of the screen. A bright yellow outline 540 around rewind/fast-forward control 530 indicates that rewind/fast-forward control 530 is active. A large yellow position arrow 545 pointing down on rewind/fast-forward control 530 indicates the user's interactive position. (TimeShift control 520 at the top of the screen is displayed overall as dim/inactive when rewind/fast-forward control 530 is active, however the yellow vertical line 585 which indicates the current playing position within the entire cached or available program remains active.)

Rewind/fast-forward control 530, designated with the familiar directional double-arrow symbols, is presented as two segments of a bar along the bottom of the display. The normal speed position gap 550 between the two segments represents normal playing speed, and on launch the large yellow position arrow 545 is positioned directly over the gap representing normal speed position 550. Fast-forward portion 560 of the bar (on the right- and side) represents different fast-forward speeds, and the rewind portion 570 of the bar (on the left-hand side) represents the different rewind speeds.

A position to the left of the gap representing normal speed position 550, either marked or unmarked, and representing motion stopped (i.e.: neither playing forward nor backward) may be imbued with magnetism, allowing the user to pause the action if desired.

Playing speed in either direction, or the state of motion stopped, will be persistent if the trigger is released (e.g. rewind) In contrast, whenever the Time Shift control is exited or dismissed, the playing speed will return to normal real time play.

This persistence, especially in the motion stopped state, may be useful to a user wanting to use TimeShift control 520 at the top of the screen to move back and forth in order to locate a particular frame of video, without it immediately beginning to move either forward or backward upon releasing the trigger drag.

Interactive movement with the yellow position arrow 545 controls the rewind or fast-forward speed. For example, when rewind/fast-forward control 530 is highlighted/selected, the user may simply [trigger-drag] in either a left or right direction to move the yellow position arrow 540 left or right. Speed bar 525 increases in length as yellow position arrow 545 is moved away from the normal speed position. As the user drags speed bar 525 to the right, the rate of the fast-forward increases. Rewind control 570 works in the same manner, but in the opposite direction.

In one alternative the user may use a left or right bump gesture 320 to jump incrementally to the next appropriate speed, either higher or lower along the complete continuum between the fastest rewind speed on the far left and the fastest forward speed on the far right.

To exit from either rewinding or fast-forwarding, a simple bump-up or bump-down gesture 320 returns yellow position arrow 545 to the normal playing speed position 550. Alternatively, the user may [trigger-drag] position arrow 545 back to the normal speed position 550.

Slow motion is logically "left of normal speed" and is implemented as the position or positions immediately left of normal speed position 550. Pause is logically implemented immediately left of slow motion. In one alternative, a second gap (or mark, virtual position, or either with magnetism to aid location) can be implemented to represent "pause," and the positions between "pause" and the normal speed position 550 represent slow motion. In this alternative, both "pause" and normal speed position 550 are shifted slightly to the right. Both are easy to return to when [trigger-dragging] and are the positions returned to when an upward bump gesture 320 stops rewinding, slow motion, or fast-forwarding.

Once the viewer is finished rewinding, fast-forwarding, or TimeShifting, a [click] (of the thumb button) will "accept" the current playing position and programming will continue from that spot and the current playing speed. If the user issues a "cancel" gesture and exits, then all setting revert to normal, including playing speed. (The display interface, including controls and icons, will disappear.) Alternatively, pressing a cancel button on remote control 200, or issuing a cancel gesture (a three times side-to-side negative [wag] are alternatives for returning the user to the currently tuned program at the playing position from which the TimeShift function was launched. This allows the user to look back/ahead and still easily return to the original spot.

To activate the TimeShift control 520 at the top of the screen, the user may execute a bump-up gesture 320 (two if currently rewinding or fast-forwarding) or a long [trigger-drag] upward.

The TimeShift Control.

Figure 5C:
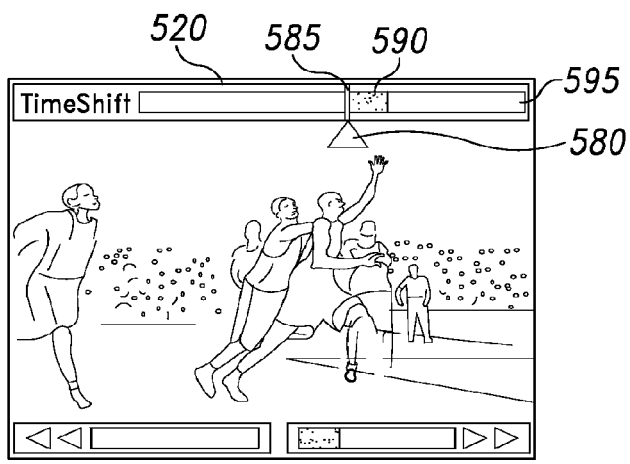
FIG. 5c is an illustration of the TimeShift display screen with the TimeShift function active.

TimeShift control 520 appears as a horizontal "thermometer-style" bar at the top of the screen. As illustrated in FIG. 5c, when active, TimeShift control 520 appears highlighted and outlined in yellow. Further, yellow position arrow 580 appears pointed directly up at the current playing position, which is represented by a bright yellow vertical line 585 (Rewind/fast-forward control 530 is displayed as dim/inactive when TimeShift control 520 is active and position arrow 545 disappears.) As play progresses, yellow position arrow 580 and yellow vertical line 585 will normally move along the thermometer bar from left-to-right.

The cache display portion 590 of TimeShift control 520 indicates how much of the currently tuned program has been cached to disk and is available for viewing. This includes the portions of the program before and after the current playing position indicated by yellow position arrow 580. The unavailable portion 595 of TimeShift control 520 indicates what portion of the program has not yet been downloaded, if any. TimeShift control 520 will fill completely with the cache display portion 590 when the program is fully cached. If the currently tuned program is currently being downloaded to disk, such as in the case of a live broadcast, the cache display portion 590 will only partially extend across the control and will expand towards the right as the program is cached. Similarly, if the beginning of the program has not been cached, the cached display portion 590 will not extend all the way to the left side of TimeShift control bar 520.

Yellow position arrow 580 and yellow vertical line 585, which indicate the current playing position, may be [trigger-dragged] to any horizontal position along the TimeShift control 520 within the cache display portion 590. [trigger-dragging] yellow position arrow 580 right will advance the program. [trigger-dragging] yellow position arrow 580 left will move to an earlier point in the program. As the user [trigger-drags] either left or right, yellow position arrow 580 and the yellow vertical line 585 will move accordingly. A second, less-highlighted vertical line, which is visible once the yellow vertical line 585 is first moved, indicates the time position of the current program at the time of activation of the TimeShift function. This indicator provides a graphic reminder that the user can easily return to that previous time. (In the preferred embodiment this is implemented in response to a "wag" gesture.) Further, the displayed currently tuned program will move forward and backward in response to movement of yellow position arrow 580 and yellow vertical line 585. As can be readily appreciated, the yellow line vertical line 585 and the indication of caching also change in response to use of rewind/fast-forward control 530 and receipt of program information.

When TimeShift control 520 is active horizontal [bumps] are mapped to jump backward and forward in specific time increments. For example, a [left-bump] gesture is mapped to automatically jump back one minute and resume playing. The same works for skipping forward by specific amounts by using [right-bump] gestures. In addition to basic instant replay and skip-ahead commercial break hopping, time jumps can be used to progressively jump back and back or forward and forward through a program. This provides a function similar to rewind and fast-forward, but in more measured jumps that don't require stopping or resetting to normal playing speed. Further, instant replay and skip-ahead are both such basic and frequently used functions within the television viewing experience, that in one alternative they are implemented in response to left-bump and or right-bump gestures during normal viewing. In this case there is no need to launch TimeShift function 520. The jump simply occurs in response to the gesture and normal playing resumes.

Once the desired time position has been reached, the user releases trigger button 210. The user can [click] (press thumb button 205) to "accept" and return to viewing the program at the newly selected time position. This exits the TimeShift function and returns the display to the normal viewing mode.

Alternatively, when TimeShift control 520 is highlighted and active, the user may execute a simple [bump-down] gesture or a long [trigger-drag] downward to select rewind/fast-forward control 530 at the bottom of the screen and reposition yellow position arrow 540 in rewind/fast-forward control 530.

As will be appreciated, TimeShift control 520 can also be used by the user as an alternative to using the rewind/fast-forward control 530. The overlap in function between TimeShift control 520 and rewind/fast-forward control 530 provides added flexibility for users.

The Program Guide.

Figure 6A:
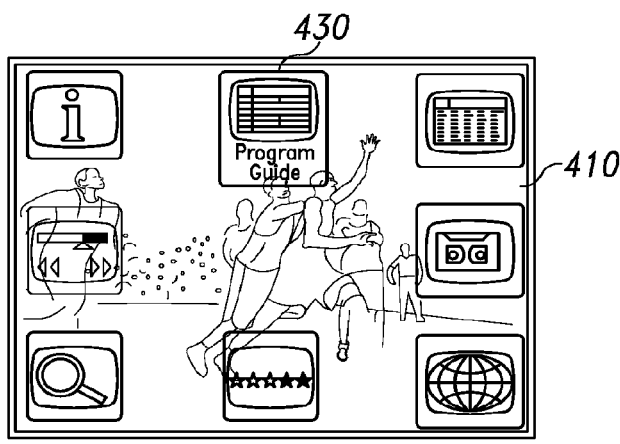
FIG. 6a is an illustration of options access display 410, with program guide icon 430 highlighted/selected.
Figure 6B:
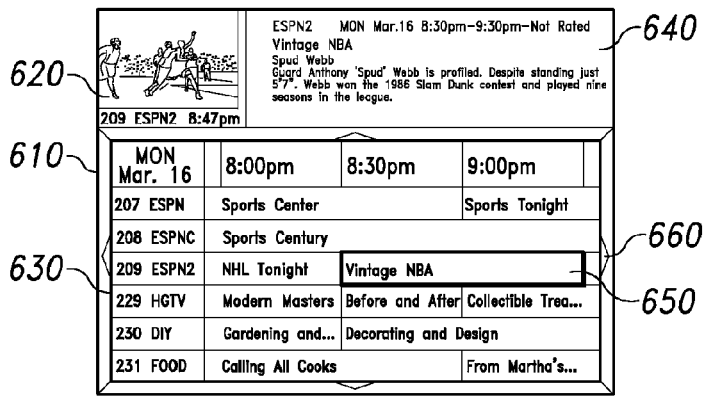
FIG. 6b is an illustration of program guide display 610.

As illustrated in FIG. 6a, highlighting program guide icon 430 in options access display 410 and pressing thumb button 205 [click] launches the program guide function, resulting in the display of program guide display 610, illustrated in FIG. 6b. Alternatively, the program guide function can be launched from a dedicated button on remote control 200.

Program guide display 610 includes the currently tuned program display 620, positioned at the top-left portion of the screen, a program guide 630 and a program information display 640. After the program guide function is launched, the currently tuned program is designated and appears highlighted with a yellow outline in program cell 650 in program guide display 640. The currently tuned program is displayed in the currently tuned program display 620, and detailed program information on the selected/highlighted program (corresponding to program cell 650) is displayed in the program information display 640.

Different programs may be designated in response to the user [trigger-dragging] to move the highlighted program cell state 650 around program guide display 640.

Moving the highlighted program cell state 650 to one of the four paging direction bars 660 allows the user to page the display in one of four corresponding directions. Once one of the paging direction bars 660 is designated, the user may [click] to page (once per page) in the direction indicated by the arrow on that bar. For example, [clicking] on the upper paging direction bar 660 causes the program guide display 610 to page up (display lower channel numbers); [clicking] on the lower paging direction bar 660 pages down (display higher channel numbers; [clicking] on the right paging direction bar 660 pages ahead (display programming forward in time); and [clicking] on the left paging direction bar 660 pages back (display programming back in time. The highlighted program cell state 650 will remain on the designated paging direction bar 660. The user then [trigger-drags] back onto program guide 630 to select a new program cell 650.

Alternately, the user may elect to switch to fast scrolling mode instead of using the paging functionality. To access this mode within the Program Guide, the user presses and holds a thumb-button associated with fast scroll mode and then [trigger-drag] to smoothly and quickly scroll through many pages worth of listings. The direction of this scrolling, either up and down through the channel or source listings, or right and left through time, will be determined by the direction the user first starts dragging after the fast scroll mode button and the trigger button are pressed and held.

The user may also lock the fast scrolling mode on by rapidly pressing the fast scroll mode button twice with the thumb. The same [double press] would return to normal paging mode, as would exiting the Program Guide and returning.

In fast scrolling mode, the paging bars disappear. As the user drags up or down, a large channel number or source identifying label is displayed prominently, superimposed over the program guide grid itself, so as to give the user visually prominent feedback as to where they are within a guide's total number of channels or sources. As the user drags left or right, a large clock and/or time in numerals will be displayed prominently, superimposed over the program guide grid, to give the user visually prominent feedback as to where they are within a guide's currently available time segments.

When the user stops at a particular program cell, releasing the trigger will stop the movement of the highlighted program cell state. Releasing the fast scroll thumb button, or [double clicking] the fast scroll button if previously [double clicked] in order to lock fast scrolling mode on, will return the program guide to normal paging mode. If the user leaves the program guide locked in fast scrolling mode, the trigger will still be required to move the highlighted program cell state around the program guide grid.

In operation, as the user [trigger-drags] the highlighted cell state (i.e. program cell 650) to different positions on program guide 630, different program cells 650 are designated and the corresponding detailed program description text appears in program information display 640. The currently tuned program will remain playing unchanged in the currently tuned program display 620.

The user can preview a designated channel by [clicking] (thumb-activated button). Previewing a designated channel tunes display 620 to the designated channel. While previewing a channel, the user may either [double-click] on the designated channel, or press a dedicated tune button on remote control 200, to tune to the selected channel. This will exit the program guide function and return to normal viewing. In one embodiment, the user may issue a "tune-to" command (a "nod" gesture) to exit the overview guide display and tune to the desired channel.

Alternatively, the user may either press a cancel button on remote control 200 or issue a "cancel" gesture (a three times side-to-side negative "wag") to exit the program guide function and return to the currently/previously tuned channel.

When either of the page-up or page-down direction bars 660 is highlighted, the user can [click] to page or [click-drag] to switch to directly to the overview guide function, where up to 500 channels are displayed on a single screen. Once in the overview guide mode, described more fully below, the user may let up on the [click] button and browse through the overview guide programming selections by [trigger-dragging] up and down the columns, moving higher in channels from the bottom of one column to the next column to the right, or moving lower in channels from the top of one column to the previous column to the left. If the user [click/drag]s while in the overview guide, it will recursively take him/her back to the program guide function. Both the program guide and Overview Guide functions are also accessible from the initial options access display, and from dedicated buttons on remote control 200.

Overview Guide.

Figure 7A:
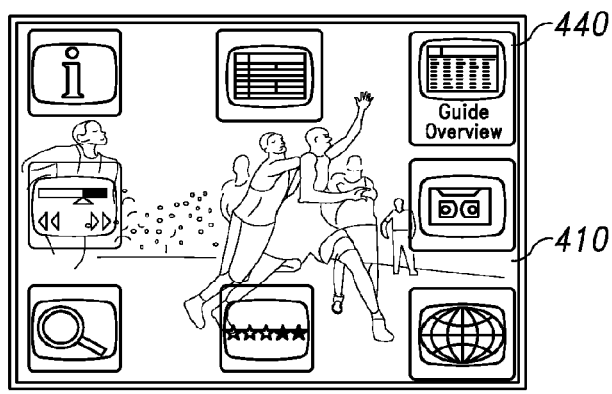
FIG. 7a is an illustration of options access display 410, with overview guide icon 440 highlighted/designated.
Figure 7B:
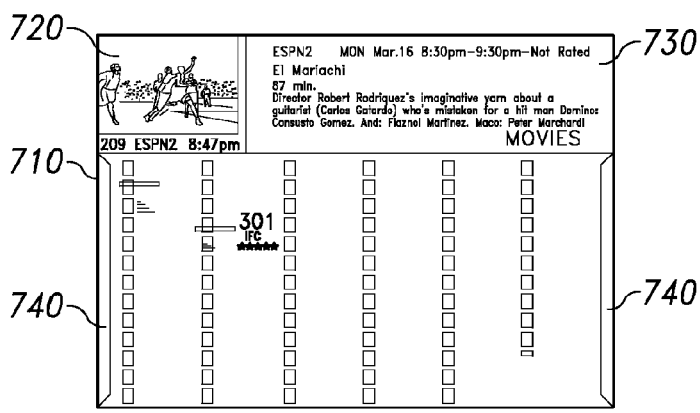
FIG. 7b is an illustration of the overview guide display screen.
Figure 8:
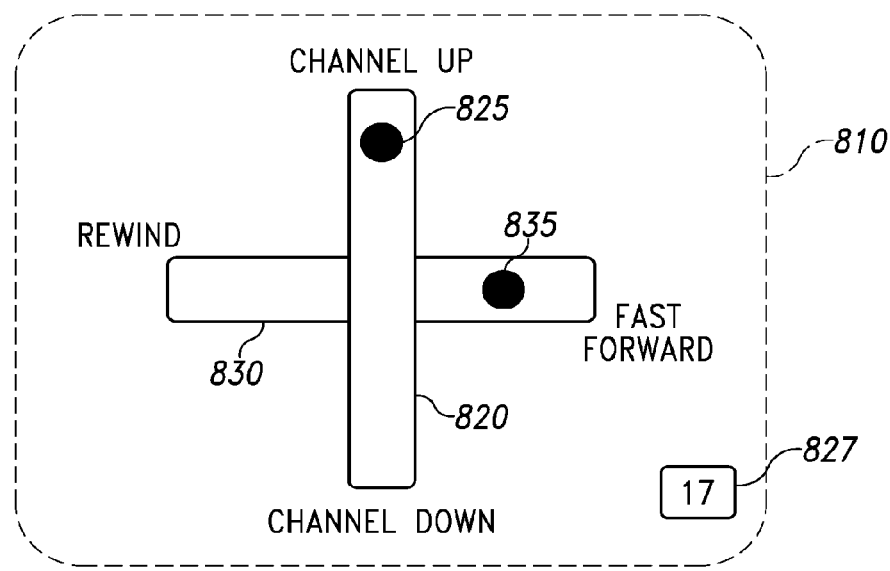
Figure 8:
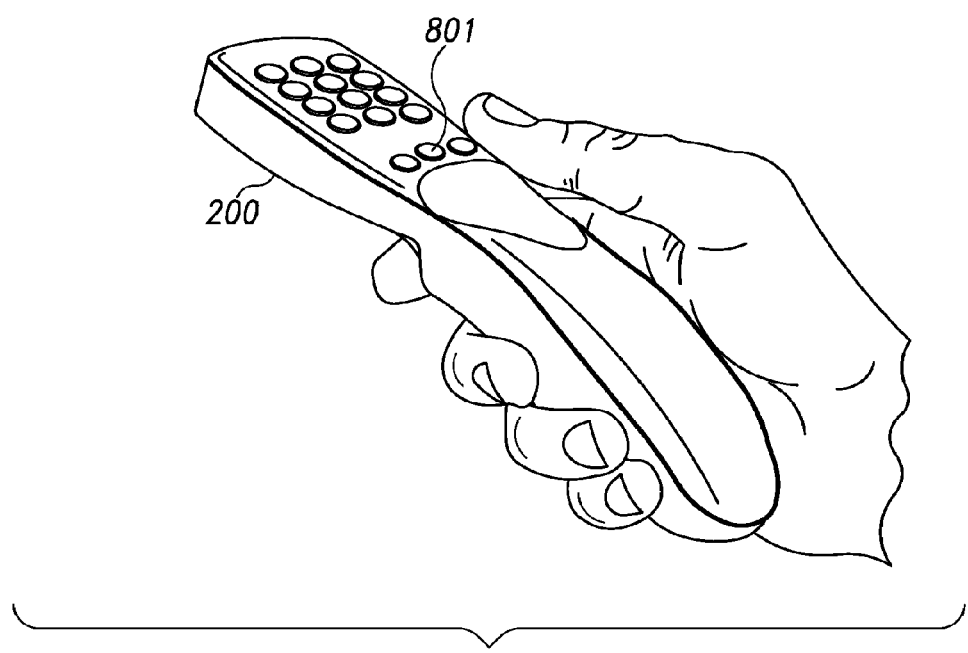

Designating overview guide icon 440 in options access display 410, as illustrated in FIG. 7a, and pressing thumb button 205 launches the overview guide function. Launching the overview guide function results in the display of overview guide display 710, as illustrated in FIG. 7b. Overview guide display 410 provides a new type of graphical user interface particularly well adapted to take full advantage of the high resolution and bandwidth of hand-held angle-sensing graphical input devices. Traditional remote controls that work with traditional grid guides are limited to comparatively slow directional "stepping." "Thumbstick" or "thumb-ball" types of controllers allow non-stepping cursor/state movement, however they do not have the accuracy, linear response and bandwidth required for desireable navigation. Preferably, the ideal controller is one with high accuracy, linear response and bandwidth, such as a hand-held angle-sensing input device allowing users to quickly sweep through and select one of a large numbers of selections without the need for a large number of keys or buttons.

Overview guide display 710 presents the display of up to 500 channels on one screen of approximately the same size and resolution as a typical program guide. Each channel/program is represented by a simple thin line, rather than a titled cell. The programs are arranged as a series of columns, divided into connected groups of six lines apiece, representing the six channels viewable on a page in program guide display 610. (Alternatively, the programs can be arranged in a series of rows, while keeping within a similar visual representation and arrangement scheme.

The aim of the overview guide is to have as many representational objects as possible on a single screen at any given time. Many other forms of programming source representation could be used as well, including regular arrays or irregular swarms or groupings of objects, which themselves could be abstract or representational. Furthermore, each line can be given a variable length to map to a user-specified or Guide-provided rating. Preferably, the range is of five different lengths, corresponding to a five-star rating. (The programming/source elements within overview guide visualizations can also be differentiated by color, size, shape, symbology, arrangement, location, or behavior representing comparative values for known meta-informational attributes. Meta-informational attributes represent information known and identified or measured about programs or program sources in a programming guide, and would include, but are not limited to, program length, file size (in the case of downloadable media, ratings of various types both universal and personal, popularity, real-time viewership, degree of conformance to user-specified criteria, date of creation, etc.)

The user may simply and easily navigate overview guide display 710, browsing the titles, channel and program information for all programs in a very large lineup from one display. When the overview guide function is launched, either via options access display 410 or from the program guide function, the currently tuned program/channel is represented by a single highlighted (yellow outline) horizontal line 710 in one of the channel columns. Directly to the right of the highlighted line is the currently tuned channel number, the channel identity initials, and a user-designated star rating. Just as in the program guide function, the currently tuned program remains viewable in the video window 720 at the screen's upper left corner and the descriptional information for the selected/highlighted program is displayed in the same area at the top right of the screen 730.

To move vertically up and down channel columns, the user [trigger-drags] (depresses the index finger trigger, holds and moves) to move the highlighted line 710 around overview guide display 710. To move horizontally between channel columns, the user [trigger-drags] side-to-side from column to column. The navigation is weighted in favor of vertical movement, allowing the user to easily move up and down the channel columns without unintentionally slipping sideways to an adjacent column. More specifically, the user interface exhibits an asymmetry between responses to y-axis inputs and x-axis inputs. Y-axis inputs, are interpreted normally. However x-axis inputs are biased such that unintended user inputs do not result in unintended jumping from column to column. This may be accomplished in a number of ways, including "widening" the columns, setting a displacement or dead zone between columns, setting a speed or acceleration threshold before allowing a jump from one column to another, and/or setting a bias to gradually return the "virtual cursor" to the center of the designated column.

When the user lets up on the [trigger], the designated program cell remains highlighted and its descriptive text will remain displayed above. The currently tuned program will remain playing in the video window at the upper left.

Color coding is employed to designate the thematic categories of programs in overview guide display 710 in order to add identification context to programs as the user moves swiftly through large numbers of programs. (Themes being one known metainformational attribute commonly known about programs or programming sources, which is also useful contextual information for the user.) White represents mixed and miscellaneous programming. Red represents movies. Green represents sports programming. Blue represents pay-per-view programming. Fuschia represents adult programming. This color coding with the thematic category is also displayed above in the highlighted program's descriptional information. In program guide display 610, the program cells are also color coded. In one alternative embodiment, the descriptional information in program guide display 610 also contains color coding to provide additional contextual information and consistent with the formatting in the overview guide function. Care should be taken in the choice of which visual, locational, or behavioral attribute is used to represent meta-information. For example, size or length of an element logically maps to the meta-informational attribute of preference, file size or program running time, where color is more appropriate to represent categorical differentiations.

Referring to FIG. 7B, two cancel/return bars 740 are located on the leftmost and rightmost sides of overview guide display 710. The user can [trigger-drag] left or right to designate and highlight one of these and [click] to exit the overview guide function and return to the currently tuned program.

Returning back to the normal display mode is consistent with the program guide function. The user tunes to the currently designated channel by either [double-clicking] on the highlighted/designated program/channel, pressing a tune button on remote control 200, or issuing a tune-to gesture (a three times up-and-down affirmative "nod" gesture to dismiss the overview guide function and tune to the desired program/channel. Alternatively, the user may return to the programming being displayed at the time the overview guide function was entered by either [trigger-dragging] to a displayed cancel bar and [clicking], pressing a cancel button on remote control 200, or issuing a "cancel" gesture (A three times side-to-side negative "wag" gesture to dismiss the overview guide function and return to the currently/previously tuned program/channel.

In the present embodiment, two bars 740 are implemented with the cancel/return functionality. However, in an alternative embodiment, a simple universal cancel button on remote control 200, or a universal cancel gesture (such as a three-times side-to-side "wag" gesture could be used to implement the cancel function. In this case the two bars 740 can be configured to allow for forward and backward time changes for the overview guide. In such an implementation the time is displayed within the overview guide and a display of different times can be responsive to either clicking on the right side bar 740, to provide a display of forward time, or by clicking on the left side bar 740, which would result in a display of previous time. Further, time-dependent display can be responsive to left and right bump gestures. Right bump gesture result in displays of forward time, and left bump gestures result in the display of previous time.

The present invention can be practiced by employing conventional materials, methodology and equipment. Accordingly, the details of such materials, equipment and methodology are not set forth herein in detail. In the previous descriptions, numerous specific details are set forth, such as specific equipment, structures, methods, etc., in order to provide a thorough understanding of the present invention. However, it should be recognized that the present invention may be practiced without resorting to the details specifically set forth. Well known programming methods have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein. Further, the description is intended to be descriptive and not limiting. For example, the description of the present invention often refers to gyroscopic and/or inertial angle-sensing user input devices such as spin gyros, bar gyros, wire gyros and accelerometers. However, many of the new interface techniques described herein may be utilized with more conventional user input devices such as mice, joysticks, arrow buttons, and other types of user input devices including but not limited to devices using imaging techniques or triangulation relative to a reference in order to detect input.

Further, other types of controllers can be used to detect pitch, yaw and roll. For example, optical sensors, such as the ones used in desktop mice (which take "pictures" of the surface) could be used in 3D (taking "pictures" of the spatial environment). Thus configured, such an optical sensor would detect angular motion of the hand or other human appendage relative to a fixed reference frame, e.g. the Earth, the living room, etc.

In another example, the present invention describes the movement of a selected/highlighted state on the graphical interface. This is variously referred to as a state change. However, as can be appreciated, a visual cursor, a virtual cursor, or some other display object or indicia of the users point of interaction can be used to implement many of the improvements described herein.

Further, although the invention has been described with reference primarily to television channels, the Overview Guide could be employed to organize and navigate through large numbers of files of other types, such audio files in an electronic jukebox implementation.

What is claimed is:

1. A method for changing the displayed time-position of a cached program on an interactive multi-channel graphic display in response to rotation of a hand-held input device in one of pitch, yaw or roll, the method comprising the steps of:
   displaying a range of selectable display time-positions on the display;
   detecting the pitch, yaw or roll rotation of the input device;
   selecting one of the selectable display time-positions in response to the pitch, yaw or roll rotation of the input device; and
   displaying the cached program at the selected display time-position on the interactive multi-channel graphic display in response to selection of the one display time-position.

2. The method as in claim 1 wherein the step of selecting one of the display time-positions includes selecting one of the display time-positions in response to a bump right or bump left gesture.

3. The method as in claim 1 wherein the step of selecting one of the display time-positions includes selecting one of the display time-positions in response to a trigger-drag right or left gesture.

4. The method as in claim 1 wherein the step of selecting one of the display time-positions includes returning to an initial time in response to a gesture.

5. The method as in claim 1 wherein the step of displaying a range of selectable display time-positions on the display includes displaying a range of selectable display time-positions on an axis.

6. The method as in claim 1 wherein the step of displaying a range of selectable display time-positions on the display includes displaying a range of available display time-positions and displaying a range of unavailable display time-positions.

7. The method as in claim 1 wherein the step of displaying a range of selectable display time-positions on the display includes displaying an initial time as a highlighted display time-position.

8. The method as in claim 1, further comprising the step of selecting a mode for display speed in response to a gesture.

9. An apparatus for changing the displayed time-position of a cached program on an interactive multi-channel graphic display in response to rotation of a hand-held input device in at least one of pitch, yaw and roll, the apparatus comprising:
   means for displaying a range of selectable display time-positions on the display;
   means for detecting at least one of the pitch, yaw and roll rotation of the input device;
   means for selecting one of the selectable display time-positions in response to at least one of the pitch, yaw and roll rotation of the input device; and
   means for displaying the cached program at the selected display time-position on the interactive multi-channel graphic display in response to selection of the one display time-position.

10. The apparatus of claim 9 wherein the means for selecting one of the display time-positions includes means for selecting one of the display time-positions in response to a bump right or bump left gesture.

11. The apparatus of claim 9 wherein the means for selecting one of the display time-positions includes means for selecting one of the display time-positions in response to a trigger-drag right or left gesture.

12. The apparatus of claim 9 wherein the means for selecting one of the display time-positions includes means for returning to an initial time in response to a gesture.

13. The apparatus of claim 9 wherein the means for displaying a range of selectable display time-positions on the display includes means for displaying a range of selectable display time-positions on an axis.

14. The apparatus of claim 9 wherein the means for displaying a range of selectable display time-positions on the display includes means for displaying a range of available display time-positions and means for displaying a range of unavailable display time-positions.

15. The apparatus of claim 9 wherein the means for displaying a range of selectable display time-positions on the display includes means for displaying an initial time as a highlighted display time-position.

16. The apparatus of claim 9, further comprising means for selecting a mode for display speed in response to a gesture.

17. The apparatus of claim 9, wherein the apparatus includes a gyroscopic element.

18. A method for changing the displayed time-position of a cached program on an interactive multi-channel graphic display in response to rotation of a hand-held input device in one of pitch, yaw or roll, the method comprising the steps of:
   displaying a plurality of selectable display time-positions on the display;
   detecting the pitch, yaw or roll rotation of the input device;
   selecting one of the selectable display time-positions in response to at least one of a bump right gesture and a bump left gesture made with the hand-held input device; and
   displaying the cached program at the selected display time-position on the interactive multi-channel graphic display in response to selection of the one display time-position.

19. A method for changing the displayed time-position of a cached program on an interactive multi-channel graphic display in response to rotation of a hand-held input device in one of pitch, yaw or roll, the method comprising the steps of:
   displaying a plurality of selectable display time-positions on the display;
   detecting the pitch, yaw or roll rotation of the input device;
   selecting one of the selectable display time-positions in response to at least one of a trigger-drag right gesture and a trigger-drag left gesture made with the hand-held input device; and
   displaying the cached program at the selected display time-position on the interactive multi-channel graphic display in response to selection of the one display time-position.

20. A method for changing the displayed time-position of a cached program on an interactive multi-channel graphic display in response to rotation of a hand-held input device in one of pitch, yaw or roll, the method comprising the steps of:
   displaying a plurality of selectable display time-positions on the display;
   detecting the pitch, yaw or roll rotation of the input device;
   selecting one of the selectable display time-positions in response to the pitch, yaw or roll rotation of the input device;
   displaying the cached program at the selected display time-position on the interactive multi-channel graphic display in response to selection of the one display time-position; and
   returning to an initial time in response to a gesture made with the hand-held input device.

21. A method for changing the displayed time-position of a cached program on an interactive multi-channel graphic display in response to rotation of a hand-held input device in one of pitch, yaw or roll, the method comprising the steps of:
   displaying a plurality of display time-positions on the display, the plurality of display time-positions including a plurality of available display time-positions and a plurality of unavailable display time-positions;
   detecting the pitch, yaw or roll rotation of the input device;
   selecting one of the display time-positions in response to the pitch, yaw or roll rotation of the input device; and
   displaying the cached program at the selected display time-position on the interactive multi-channel graphic display in response to selection of the one display time-position.

22. An apparatus for changing the displayed time-position of a cached program on an interactive multi-channel graphic display in response to rotation of a hand-held input device in one of pitch, yaw or roll, the apparatus comprising:
   means for displaying a plurality of selectable display time-positions on the display;
   means for detecting the pitch, yaw or roll rotation of the input device;
   means for selecting one of the selectable display time-positions in response to at least one of a bump right gesture and a bump left gesture made with the hand-held input device; and
   means for displaying the cached program at the selected display time-position on the interactive multi-channel graphic display in response to selection of the one display time-position.

23. An apparatus for changing the displayed time-position of a cached program on an interactive multi-channel graphic display in response to rotation of a hand-held input device in one of pitch, yaw or roll, the apparatus comprising:

means for displaying a plurality of selectable display time-positions on the display;

means for detecting the pitch, yaw or roll rotation of the input device;

means for selecting one of the selectable display time-positions in response to at least one of a trigger-drag right gesture and a trigger-drag left gesture made with the hand-held input device; and means for displaying the cached program at the selected display time-position on the interactive multi-channel graphic display in response to selection of the one display time-position.

24. An apparatus for changing the displayed time-position of a cached program on an interactive multi-channel graphic display in response to rotation of a hand-held input device in one of pitch, yaw or roll, the apparatus comprising:

means for displaying a plurality of selectable display time-positions on the display;

means for detecting the pitch, yaw or roll rotation of the input device;

means for selecting one of the selectable display time-positions in response to the pitch, yaw or roll rotation of the input device;

means for displaying the cached program at the selected display time-position on the interactive multi-channel graphic display in response to selection of the one display time-position; and means for returning to an initial time in response to a gesture made with the hand-held input device.

25. An apparatus for changing the displayed time-position of a cached program on an interactive multi-channel graphic display in response to rotation of a hand-held input device in one of pitch, yaw or roll, the apparatus comprising:

means for displaying a plurality of display time-positions on the display, the plurality of display time-positions including a plurality of available display time-positions and a plurality of unavailable display time-positions;

means for detecting the pitch, yaw or roll rotation of the input device;

means for selecting one of the display time-positions in response to the pitch, yaw or roll rotation of the input device; and means for displaying the cached program at the selected display time-position on the interactive multi-channel graphic display in response to selection of the one display time-position.

* * * * *